United States Patent Office 2,827,969
Patented Mar. 25, 1958

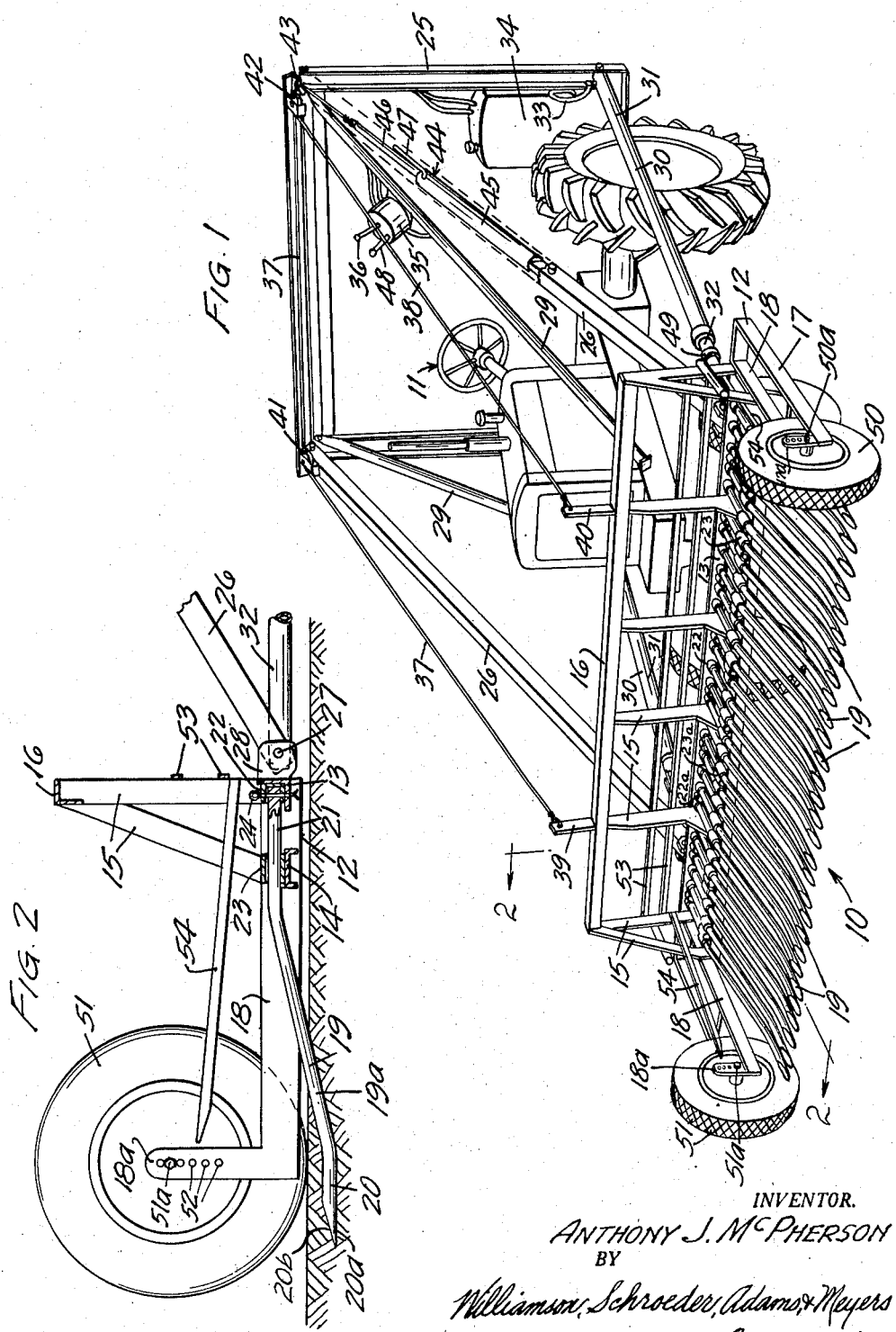

2,827,969

ROCK PICKUP AND DUMPING DEVICE

Anthony J. McPherson, Great Falls, Mont.

Application June 6, 1955, Serial No. 513,396

5 Claims. (Cl. 171—105)

This invention relates to power machinery and more specifically relates to a power operated rock pickup and dumping device. This application constitutes a continuation-in-part of my pending application S. N. 343,011, filed March 18, 1953 and entitled, Rock Pickup and Dumping Device, now abandoned.

In order to effectively pick up the rocks and field stones which hamper the working of the ground in a field, it is necessary to get under the rocks with the pickup media such as tines or the like, so as to lift them. It is well known that rocks are usually partially embedded in the ground. In order to get the rock pickup media beneath the rocks or field stones, it is necessary to move the media through the ground beneath the ground surface. Because of the great friction between the rock pickup media and the ground, substantial power is required in order to force this rock pickup media through the ground and to operate the pickup device. It has been found that substantial power is required to push tines through the ground and, occasionally, rocks will become lodged between adjacent tines so as to require more power to operate the rock pickup device or require that the device be stopped and the lodged rock or field stone be dislodged. It has also been found that occasionally the tines will strike a rock substantially dead center and the rock is pushed along for a short way until the rock either passes under the tines or passes upwardly thereonto.

With these comments in mind, it is to the provision of a rock pickup device to overcome these various factors that my invention is directed along with the inclusion therein of other novel and desirable features.

An object of my invention is to provide a new and improved device of relatively simple and inexpensive construction, maintenance and operation, for picking up and collecting rocks and field stones with a minimum of power expenditure when the same is operated in a field for clearing the rocks therefrom.

Another object of my invention is the provision of a novel rock pickup device constructed to permit the free flow of rocks thereonto and to limit the jamming of rocks thereon as the same are being picked up.

A still further object of my invention is to provide a new rock picking device having tines which pass through the ground adjacent the surface for picking up and collecting rocks thereon and which are so constructed as to substantially preclude rocks and field stones from becoming lodged therebetween.

A further object of my invention is the provision of an improved rock pickup device comprising an attachment for a power implement for picking up and collecting rocks and field stones thereon and then dumping the field stones in a desired location.

A still further object of my invention is to provide a rock pickup and dumping device which is adapted to be located in the same position, relative to the ground surface, each time it is shifted into rock picking position from dumping position.

These and other objects and advantages of my invention will more fully appear from the following description made in connection with the accompanying drawings wherein like reference characters refer to the same or similar parts throughout the several views and in which:

Fig. 1 is a perspective view with parts broken away, of the rock pickup device viewed from a position forwardly and to one side thereof; and Fig. 2 is a detail vertical section view in an enlarged scale of the rock pickup device with portions thereof broken away and wherein the section is taken on a vertical plane extending in a fore-and-aft direction as indicated by the numerals 2—2 of the drawings.

The rock pickup device is indicated in general by numeral 10, shown in the present form mounted on a tractor, indicated in general by numeral 11. The rock pickup device 10 includes a rigid frame 12 which is comprised of an elongated angle iron 13 and a downwardly facing channel 14 which are spaced apart from each other and which extend transversely across the front end of the tractor 11. Frame 12 also includes upstanding members 15 which are secured together at their upper ends by means of cross braces 16. A pair of rigid support members 17 and 18 are affixed to each of the opposite ends of frame 12 and extend forwardly therefrom.

A plurality of elongated and substantially rigid tines or teeth 19 are mounted on frame 12 and extend forwardly therefrom. Tines 19 are constructed of a resilient high carbon steel and will flex slightly, but will resiliently return to their original shape. The rock-dislodging, ground piercing forward portions 20 of the tines 19 and the rock-collecting and carrying rearwardly disposed portions 21 of the tines 19 are substantially parallel to each other, but are offset from each other. The rear end portions 21 of the tines 19 are substantially horizontally disposed in the normal position of frame 12 and provide a rock-collecting deck. The front end portions 20 of the tines 19 are beveled to provide a sharpened point 20a thereon and to define forwardly and upwardly facing oblique ground-engaging surfaces 20b. The rock-conveying intermediate portions 19a of the tines 19 are inclined with respect to both the forward and rearward portions 20 and 21 thereof. Means are provided for securing tines 19 on frame 12, but permitting the tines 19 to wobble or shake in a transverse direction relative to the direction of travel. In the form shown, such means include a plurality of horizontally disposed sleeves 22 affixed on the angle iron 13 in spaced relation with each other, and a plurality of guide sleeves 23 which are affixed on the upper side of channel 14 in co-extending relation with corresponding sleeves 22 on the angle 13. The rear end portions 21 of the tines 19 extend through the sleeves 23 and into the sleeves 22 for abutment against the upstanding flange of angle iron 13. The external diameter of the rear end portion 21 of tines 19 is substantially less than the internal diameter of sleeves 23 and 22. The rear end portions 21 of tines 19 thereby fit loosely in the sleeves 22 and 23 so as to permit wobbling or shaking of the tines in a transverse direction with respect to the tines. Tines 19 are, in the form shown, secured in the sleeves 22 by means of large pins 24 such as cotter pins which extend through suitably provided apertures in sleeves 22, the rear end portions 21 of tines 19 and through the bottom flange of angle iron 13. As best shown in Fig. 2, the frame 12 is normally maintained in close relation with the ground surface and the forward end portions of the tines are normally projected into the ground for movement therethrough adjacent the surface.

Means are provided for attaching the frame 12 and tines 19 to a tractor to permit tilting of the frame and tines about a generally horizontal axis and to permit substantially vertical movement of the frame 12 and tines 19. In the form shown, such attaching means include apparatus of the general type employed in mounting front end loaders on tractors and as shown include an upstanding loader frame 25 secured to the chassis of the tractor 11 adjacent the rear end thereof. A pair of elongated and rigid booms 26 are vertically swingably connected at their upper ends to the upper end of frame 25, and are pivotally connected by pins 27 to flanges or ears 28 which are affixed to the frame 12. A pair of rigid bracing members 29 are affixed at their opposite ends to the tractor chassis adjacent the front end thereof and to the upper portion of loader frame 25. The attaching means also includes power lift means which, in the form shown, comprises a pair of extendable and retractable hydraulic cylinders or rams 30. Hydraulic cylinders 30 include a casing 31 pivotally connected at its closed end for vertical swinging movement to the lower portion of loader frame 25. Each of the cylinders 30 also includes a piston or plunger 32 which is slidably received within the casing 31 and which is pivotally connected at its forward end to frame 12 by pivot 27. Hydraulic cylinder 30 may be controlled by any suitable means and in the form shown is supplied with hydraulic fluid through hose 33 from reservoir 34 and from the pressure pump (not shown) and is controlled by the valve mechanism 35 and handle 36 connected thereto. The pressure pump may be of any suitable type driven from the tractor engine. The valve mechanism 35 is mounted on one of the braces 29 in close relation to the driver's seat of the tractor so as to be easily operated by the tractor operator.

Means are also provided for tilting the frame 12 and tines 19 and in the form shown, such means include a pair of cables 37 and 38 which are respectively secured to upstanding arms 39 and 40 disposed adjacent opposite ends of frame 12 and rigid therewith. Cables 37 and 38 are respectively directed toward the opposite upper corners of loader frame 25. Cable 37 is trained over pulley 41 and is guided across the top of frame 25 and trained over pulley 42. Cable 38 is trained over pulley 43. The power means for tilting frame 12 and tines 19 is connected with cables 37 and 38 for pulling the same, and in the form shown, such means include an extendable and retractable cylinder apparatus 44 affixed within the hollow interior of one of the booms or torque bar 26 and having a cylinder 45 and a piston rod 46 to which cables 37 and 38 are both attached. Hydraulic cylinder apparatus 44 may be of the single acting type and is connected by suitably provided hose 47 to the hydraulic fluid reservoir 34, the hydraulic pressure pump (not shown) and the hydraulic valve apparatus 35. Hydraulic cylinder apparatus 44 is controlled by operation of valve handle 48.

The rock picking device also includes means for repositioning the frame and tines in a certain predetermined position relative to the ground surface each time the tines are brought into operative position after the same had been elevated for dumping rocks therefrom. In the form shown such means include a stop element 49 affixed to the shiftable plunger 32 of hydraulic cylinder 30 and being engageable with the forward end of casing 31 for precluding further shifting of plunger 32 into casing 31. Stop member 49 may be releasably connected to the plunger 32 so as to permit adjustment of the position thereof. Such means also include a pair of ground-engaging supports or support wheels 50 and 51 which constitute guide means for maintaining the forward ends of the tines at a predetermined position with respect to the ground surface, and which are respectively journalled at the opposite ends of frame 12 between the inner and outer forwardly projected support members 17 and 18. Upstanding mounting elements 17a and 18a are provided at the forward ends of support members 17 and 18 and have a plurality of vertically aligned apertures 52 therein adapted to receive the axles of the wheels 50 and 51. Wheels 50 and 51 support the frame 12 as they roll on the ground and also maintain the forward end portions 20 of tines 19 at a certain desired distance relative to the ground surface. The axles 50a and 51a of wheels 50 and 51 may be shifted into other of the apertures 52 to permit the frame to be carried at a higher or lower position relative to the ground surface.

Means are also provided on frame 12 for retaining rocks pushed up onto the rear end portions 21 of tines 19, and in the form shown, such means include a pair of rigid retaining bars 53 disposed above the angle iron 13 and secured to the upstanding members 15. The bars 53 and the deck formed by the substantially horizontal rear end portions 21 of tines 19 cooperate when the frame 12 and tines 19 are tilted about pivot 27 in cradling rocks and field stones therebetween to preclude loss of the rocks from the pickup device.

Means are also provided for preventing rocks from spilling out the opposite ends of frame 12 from tines 19 when the tines are in operation. In the form shown, such means include a pair of forwardly extending arms or retaining bars 54 secured at their rear end portions to upstanding frame members 15 and extending forwardly into proximity with wheels 50 and 51.

As best shown in Fig. 1, it will be seen that the tine-mounting sleeves 22 and 23 are spaced from each other a substantial distance. In addition, a plurality of auxiliary mounting sleeves 22a and 23a are provided between the other sleeves 22 and 23 to permit the tines to be rearranged in the sleeves so as to widen the spacing between the tines. When the tines are rearranged in these auxiliary sleeves smaller rocks are permitted to pass between the tines and the tines will only pick up the larger rocks.

*Operation*

In operation, the hydraulic pressure is applied through the hydraulic system by the hydraulic pressure pump to valve mechanism 35 for application to the separate hydraulic cylinders 30 and 44 when desired. The cylinder 30 will be extended to cause raising of the frame 12 and tines 19 off the ground when it is desired to drive the tractor into position to start rock picking operations. When the tractor is in position to commence rock picking operations, the valve handle 36 is again operated to permit hydraulic fluid to be discharged from the hydraulic cylinder 30 and to permit the frame 12 and tines 19 to be lowered to the ground. The wheels 50 and 51 are mounted in the desired positions in apertures 52 so as to carry the forward portions of the frame 12 and the forward end portions 20 of tines 19 substantially in the position shown in Fig. 2. Depending upon the nature of the soil to be worked and depending upon the depth of the rocks in the soil, the forward end portions 20 of tines 19 may be raised or lowered by adjusting the vertical position of wheels 50 and 51 with respect to frame 12. It has been found in practice that in many types of soils the forward end portions 20 of tines 19 should be disposed approximately one to two inches beneath the ground surface. The rearward portion of frame 12 is maintained at a predetermined desired height from the ground surface by means of stop elements 49 engaging the forward portions of hydraulic casings 31. The frame, when maintained in substantially the position shown in Fig. 2 does not engage the ground.

The tractor will then be moved forwardly pushing the forward end portions 20 of tines 19 through the ground. As the tines 19 progress through the ground, they shake or wobble very vigorously and will flex slightly and resiliently vibrate in a direction transversely of their direction of forward movement both sideways and up and down. This shaking of the tines is caused by the ground and by the movement of the tines. The ground is substantially loosened by means of this shaking of the tines and therefore the friction between the tines and the ground is reduced, thus requiring less power to shift the tines through the ground than if the tines remained stationary. When the tines come into contact with a field stone on the surface of the ground or embedded slightly therein, the rock will be lifted by the tines and will move upwardly thereon. The shaking and vibrating of the tines prevents the rock from binding between adjacent tines and therefore the rock is effectively pushed rearwardly toward the rear end portions 21 of the tines 19. Some of the earth beneath which the forward end portions 20 of the tines 19 pass tends to move upwardly toward the rear portions of the tines but the vigorous shaking and vibrating of the tines causes this earth to be broken into small particles and to be dropped between the tines onto the ground again. As more and more rocks and field stones are collected on top of the tines 19, the other rocks already thereon are pushed upwardly over the inclined intermediate portions 19a of the tines 19 and onto the substantially horizontal deck provided by the juxtaposed rear end portions 21 thereof. The rocks are retained on the deck by the retaining bars 53 which extend horizontally across the frame 12.

When a substantial quantity of rocks have been collected on top of the tines 19, it is desirable to dump the collected rocks into a pile of rocks or into an awaiting truck. The hydraulic cylinder 30 will thereupon be extended to raise the frame 12 and the tines 19 out of the ground. Substantially simultaneously with the raising of frame 12 the hydraulic cylinder 44 is operated to retract the piston rod 46 thereof and to pull the cables 38 in a rearward direction, thus tilting the frame 12 and elevating the forward end portions 20 of tines 19 above the rearward end portions 21 thereof. The tines 19 and the retaining bars 53 thereupon cooperate to cradle the collected rocks and field stones therebetween. The tractor may thereupon be driven to the pile of stones for dumping the same thereon. When the stones are to be dumped, the hydraulic cylinder 44 is again operated to extend the piston rod 46 thereof and to permit tilting of the tines 19 in a downward direction. During the rock collecting operation and during the carrying and dumping operation, the forwardly extending arms 54 prevent rocks and stones from falling off the ends of frame 12 and prevent the collected rocks and stones from interfering with wheels 50 and 51.

When it is desired to pick up different sized rocks with the rock picking device, certain of the tines 19 may be removed from their respective mounting sleeves 22 and 23 and other of the tines 19 may be moved over into different of the sleeves 22 and 23 so as to provide a new and different spacing between the tines 19. It has been found in the operation of the present invention several different spacings between the tines may be had with the sleeves shown in Fig. 1. The spacings may be made half again as large as those shown or they may be made twice as large as those shown.

It will be seen that I have provided a new and improved rock picking device having a plurality of tines which pass through the ground for picking up and collecting rocks thereon, and which are so mounted to permit them to shake vigorously as they pass through the ground so as to prevent rocks from becoming lodged as by binding between the tines and to thereby reduce the amount of power necessary to push the tines through the ground.

It should also be noted that I have provided in my novel rock picking device having tines which collect and carry rocks for dumping at a desired location, means for repositioning the tines at a predetermined desired position relative to the ground surface after the same have been raised for carrying and dumping the rocks collected thereon.

It will also be apparent that I have provided a rock picking device which efficiently elevates the collected rocks from the soil as the rocks are picked up and which provides a rock and stone carrying deck for collecting the rocks in an out-of-the-way position relative to the portion of the device for picking the rocks off the ground.

It will, of course, be understood that various changes may be made in the form, detail, arrangement and proportion of the parts without departing from the scope of my invention which consists of the matter described herein and set forth in the appended claims.

What is claimed is:

1. A rock pickup device for use with a ground power implement and comprising a frame adapted for attachment to such an implement and a plurality of elongated tines extending along the ground surface and in side by side relation in the direction of travel of the implement, said tines being mounted on said frame adjacent the ground surface for transverse wobbling and shaking movement, said tines having rock-engaging forward ends and ground-engaging guide means mounted on said frame adjacent the forward ends of the tines for positioning and maintaining the forward ends of said tines at a predetermined position with respect to the ground surface.

2. The structure recited in claim 1 wherein said guide means include a pair of ground wheels mounted on said frame adjacent the forward ends of the tines for maintaining the same at predetermined desired positions relative to the ground surface.

3. A rock pickup device for use with a ground power implement and comprising a frame adapted for attachment to such an implement and a plurality of elongated tines mounted on said frame and extending in juxtaposition in the direction of travel of the implement for movement into and through the ground surface, said tines having stone-dislodging pointed forward portions and having rearwardly inclined intermediate portions and substantially horizontal rock-collecting and carrying rear portions, whereby as said forward portions pass through the ground adjacent the surface rocks will be dislodged and pushed rearwardly over the inclined intermediate portions of the tines and onto the substantially horizontal rearward portions.

4. In a rock pickup device, the combination of a ground power implement having ground-engaging supports, a plurality of juxtaposed tines mounted for free shaking movement on the implement and extending along the ground surface and in the direction of travel of the implement, said tines having forward ends disposed below the ground surface and also having upwardly and forwardly facing oblique ground-engaging surfaces at the forward ends, whereby the soil engages said surfaces and continuously draws the tines into the soil for engaging and picking up rocks.

5. A rock pickup device for use with a mobile ground-supported power implement and comprising a frame adapted for attachment to such an implement and a plurality of elongated tines extending in side-by-side relation in the direction of travel of the implement and extending along the ground surface, said tines being mounted on said frame for wobbling movement and having forward ends disposed below the ground-engaging supports of the implement, the tines having downwardly inclined portions adjacent the forward ends thereof and extending into the ground whereby the tines are continuously drawn into the ground, and said tines also having rearwardly disposed portions above the ground surface and forming a substantially horizontal deck for collecting rocks thereon after the same have been pushed rearwardly and upwardly on the tines, whereby the forward ends of the tines move beneath the ground surface to engage and pick up rocks and to cause said tines to shake vigorously to restrict binding of rocks therein and therebetween and permit such rocks to move rearwardly thereover.

References Cited in the file of this patent

UNITED STATES PATENTS

| | | |
|---|---|---|
| 1,478,142 | Ortmann | Dec. 18, 1923 |
| 2,267,237 | Heimark | Dec. 23, 1941 |
| 2,295,917 | Schwan | Sept. 15, 1942 |
| 2,478,282 | Kyker | Aug. 9, 1949 |